United States Patent
Kuroda et al.

(10) Patent No.: US 10,701,227 B2
(45) Date of Patent: Jun. 30, 2020

(54) ORIGINAL-DOCUMENT-FEEDING APPARATUS, IMAGE-READING APPARATUS, AND IMAGE-FORMING APPARATUS

(71) Applicant: SHARP KABUSHIKI KAISHA, Sakai, Osaka (JP)

(72) Inventors: Kenji Kuroda, Sakai (JP); Yasumasa Morimoto, Sakai (JP)

(73) Assignee: SHARP KABUSHIKI KAISHA, Sakai, Osaka (JP)

( * ) Notice: Subject to any disclaimer, the term of this patent is extended or adjusted under 35 U.S.C. 154(b) by 0 days.

(21) Appl. No.: 16/216,913

(22) Filed: Dec. 11, 2018

(65) Prior Publication Data

US 2019/0199873 A1 Jun. 27, 2019

(30) Foreign Application Priority Data

Dec. 21, 2017 (JP) .................. 2017-244596

(51) Int. Cl.
*H04N 1/12* (2006.01)
*H04N 1/00* (2006.01)

(52) U.S. Cl.
CPC ..... *H04N 1/00602* (2013.01); *H04N 1/00594* (2013.01); *H04N 1/121* (2013.01); *H04N 1/00543* (2013.01); *H04N 2201/0094* (2013.01)

(58) Field of Classification Search
CPC ........... G03G 15/0865; G03G 15/0889; G03G 15/0893; G03G 15/0875; G03G 15/0877; G03G 15/08; G03G 15/0848; G03G 15/0862; G03G 15/0868; G03G 15/0872; G03G 15/0874; G03G 15/0881; G03G 15/095; G03G 2215/066; G03G 2215/0668; G03G 2215/0827; G03G 2215/0897; B41J 2002/17576; B41J 2/175; B41J 2/17566;
(Continued)

(56) References Cited

U.S. PATENT DOCUMENTS

2009/0324312 A1* 12/2009 Kusama ................ B65H 29/14
399/405
2010/0123282 A1* 5/2010 Miyakoshi ............ B65H 5/38
271/3.19
(Continued)

FOREIGN PATENT DOCUMENTS

JP          2012-076830 A      4/2012

*Primary Examiner* — Negussie Worku
(74) *Attorney, Agent, or Firm* — ScienBiziP, P.C.

(57) ABSTRACT

An image-forming apparatus includes an image-reading unit. The image-reading unit includes a first member and a second member. The image-reading unit includes an original-document-feeding apparatus that conveys an original document from an original-document-loading tray to a discharge tray via a read position. In the first member and the second member, a first conveyance passage along which the original document is conveyed to the read position and a second conveyance passage along which the original document is conveyed from the read position to the discharge tray are formed. The second member includes at least two conveyance rollers. Between the two conveyance rollers, there are opening edges for partly allowing access to the second conveyance passage. The second member includes a lid for covering an opening that is defined by the opening edges.

10 Claims, 12 Drawing Sheets

(58) Field of Classification Search
CPC ........... H04N 1/00543; H04N 1/00594; H04N 1/00602; H04N 1/121; H04N 2201/0094
USPC ...................................... 399/106, 254, 262
See application file for complete search history.

(56) References Cited

U.S. PATENT DOCUMENTS

| | | | |
|---|---|---|---|
| 2011/0074087 A1* | 3/2011 | Akimatsu | B65H 3/0684 271/3.18 |
| 2012/0081765 A1 | 4/2012 | Takeuchi | |
| 2012/0112401 A1* | 5/2012 | Tokutsu | B65H 5/26 271/3.19 |
| 2013/0083336 A1* | 4/2013 | Miura | H04N 1/00519 358/1.12 |
| 2014/0320877 A1* | 10/2014 | Kaneko | G06K 15/16 358/1.13 |
| 2015/0189111 A1* | 7/2015 | Otsuki | H04N 1/00575 358/1.12 |
| 2016/0318724 A1* | 11/2016 | Yamaguchi | B65H 5/38 |
| 2017/0297843 A1* | 10/2017 | Kakuta | B65H 7/02 |
| 2017/0331970 A1* | 11/2017 | Osanai | H04N 1/0032 |
| 2017/0351209 A1* | 12/2017 | Nagano | B65H 3/44 |
| 2018/0020108 A1* | 1/2018 | Nakayama | B65H 5/068 |
| 2018/0041657 A1* | 2/2018 | Kohama | H04N 1/053 |
| 2018/0164727 A1* | 6/2018 | Zuo | H04N 1/00411 |
| 2018/0270375 A1* | 9/2018 | Imaki | H04N 1/00602 |
| 2018/0297802 A1* | 10/2018 | Ishida | G03G 15/5029 |
| 2019/0064703 A1* | 2/2019 | Minamoto | G03G 15/0865 |

\* cited by examiner

ORIGINAL-DOCUMENT-FEEDING APPARATUS, IMAGE-READING APPARATUS, AND IMAGE-FORMING APPARATUS

BACKGROUND

1. Field

The present disclosure relates to an original-document-feeding apparatus, an image-reading apparatus, and an image-forming apparatus and more particularly, to an original-document-feeding apparatus, an image-reading apparatus, and an image-forming apparatus in which an original document that is fed from an original-document-loading table is conveyed.

2. Description of the Related Art

An example of an image-reading apparatus in the related art is disclosed in Japanese Unexamined Patent Application Publication No. 2012-76830. The image-reading apparatus in Japanese Unexamined Patent Application Publication No. 2012-76830 includes an auto document feeder that conveys an original document that is placed on an original-document table along a predetermined conveyance passage. The conveyance passage in the auto document feeder includes a U-turn passage along which the original document that is conveyed from the original-document table toward a discharge portion makes a U-turn during conveyance. A swingable member is mounted on a lower passage downstream of the U-turn passage so as to be swingable with respect to a base member of the auto document feeder. The position of the swingable member changes into an open position by the own weight when the auto document feeder is opened and changes into a close position by the own weight when the auto document feeder is closed. The swingable member functions as a wall surface that forms the lower passage while being at the close position. While the swingable member is at the open position, access to the lower passage is partly allowed therefrom.

The existing image-reading apparatus, however, has a problem in that the mechanical strength of the conveyance passage is not sufficient because a part of the conveyance passage for the original document is formed by the swingable member and a conveyance failure occurs due to strain of the conveyance passage, for example, such that the original document that is conveyed is obliquely fed.

Accordingly, it is desirable to provide a new original-document-feeding apparatus, a new image-reading apparatus, and a new image-forming apparatus.

It is also desirable to provide an original-document-feeding apparatus, an image-reading apparatus, and an image-forming apparatus that inhibit a conveyance failure of the original document from occurring and that enable a residual piece of paper or other substances on the conveyance passage for the original document to be readily removed.

SUMMARY

An original-document-feeding apparatus according to an aspect of the present disclosure includes an original-document-loading tray, a first conveyance passage, a second conveyance passage, a conveyance-passage forming member, and a lid. An original document is conveyed along the first conveyance passage from the original-document-loading tray to a predetermined position. A second conveyance passage is connected to the first conveyance passage, and the original document is conveyed along the second conveyance passage after the original document passes through the predetermined position. The conveyance-passage forming member forms at least a lower surface of the second conveyance passage. The conveyance-passage forming member has an opening. The lid opens and closes the opening.

Features and advantages of the present disclosure will be more apparent from embodiments described in detail later with reference to the following drawings.

DESCRIPTION OF THE EMBODIMENTS

First Embodiment

Figure 1:
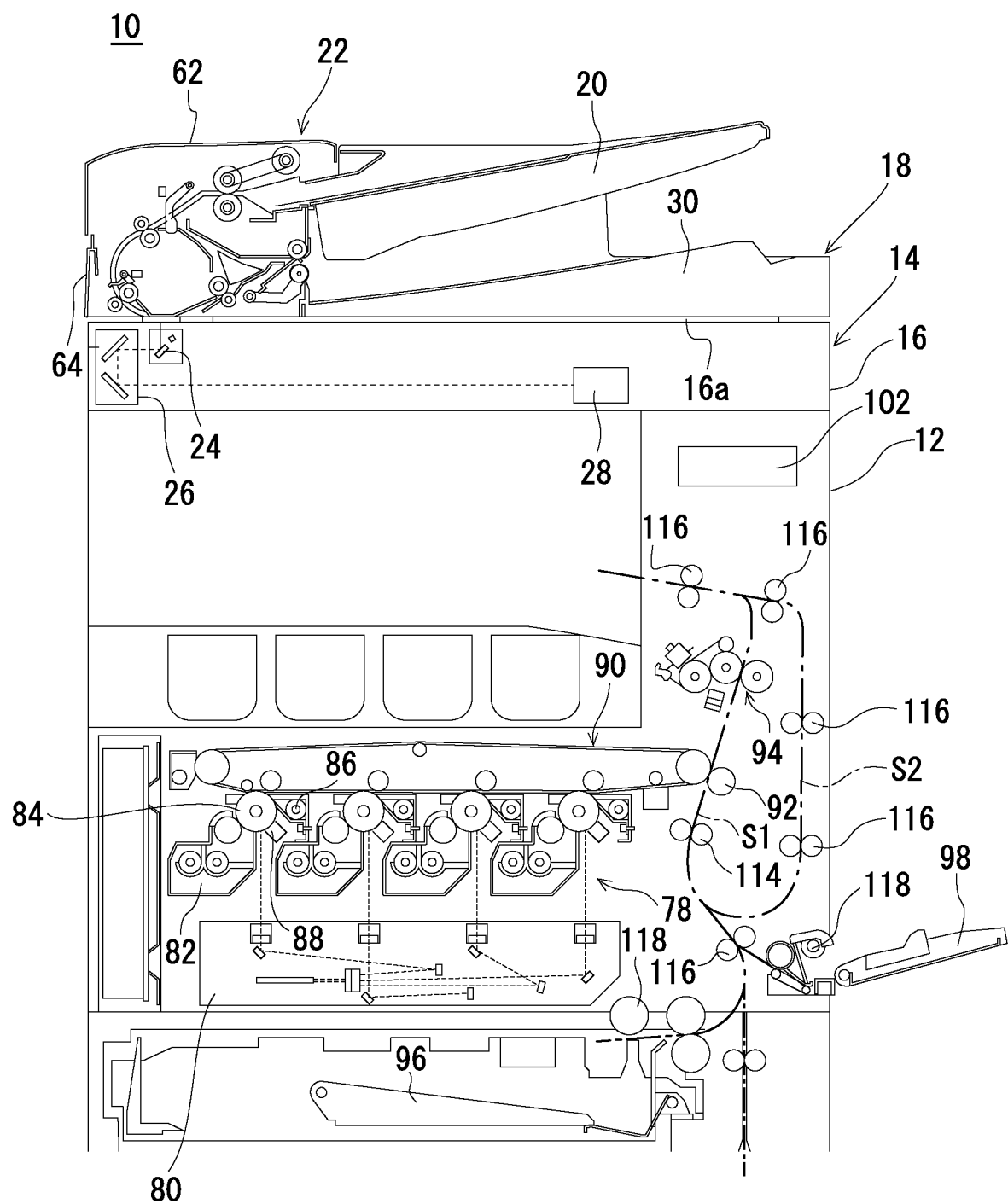
FIG. 1 illustrates an example of an internal structure of an image-forming apparatus including an original-document-feeding apparatus according to a first embodiment of the present disclosure.
Figure 2:
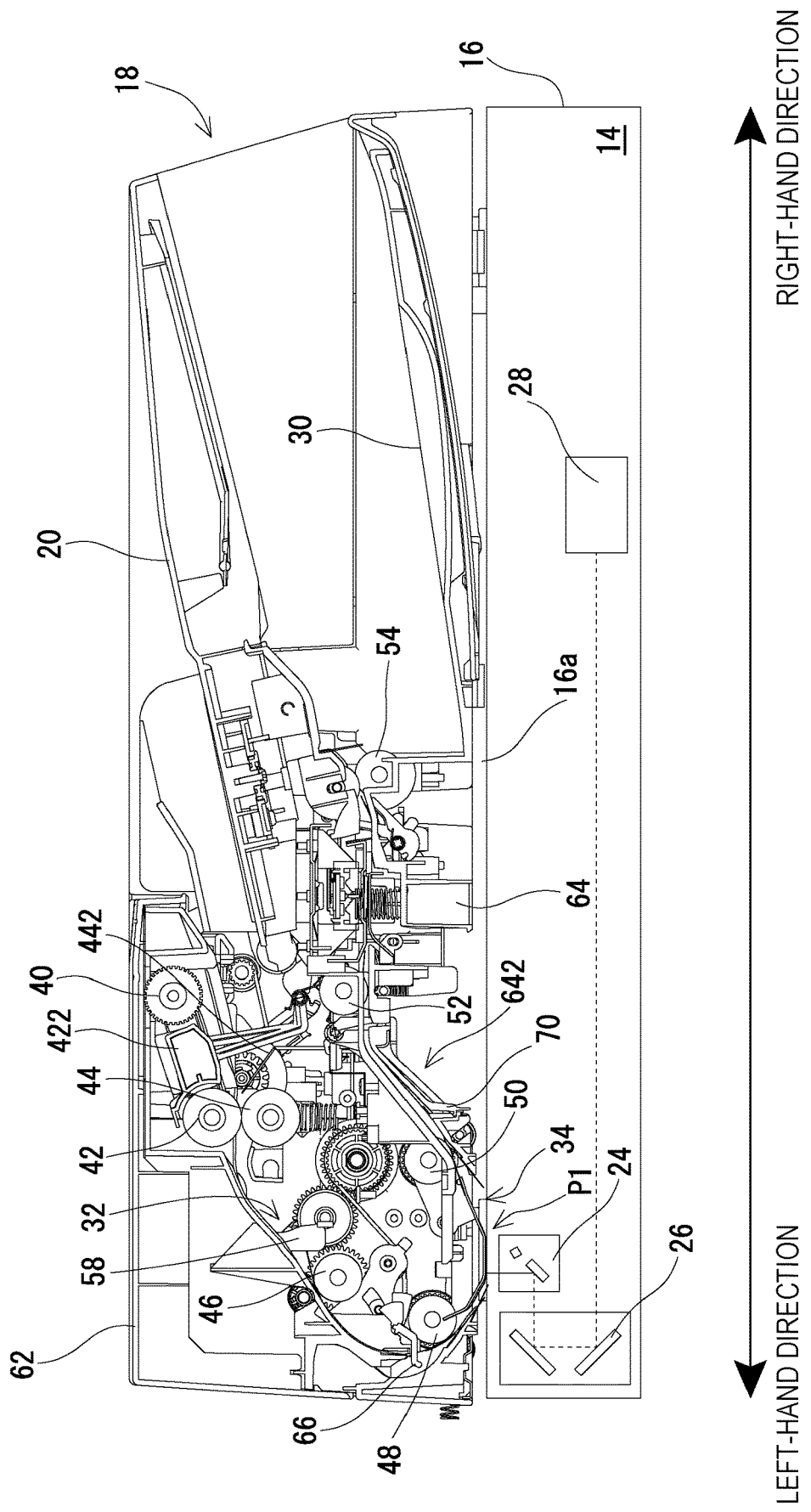
FIG. 2 is a schematic sectional view of an internal structure of the original-document-feeding apparatus with a lid closed.
Figure 3:
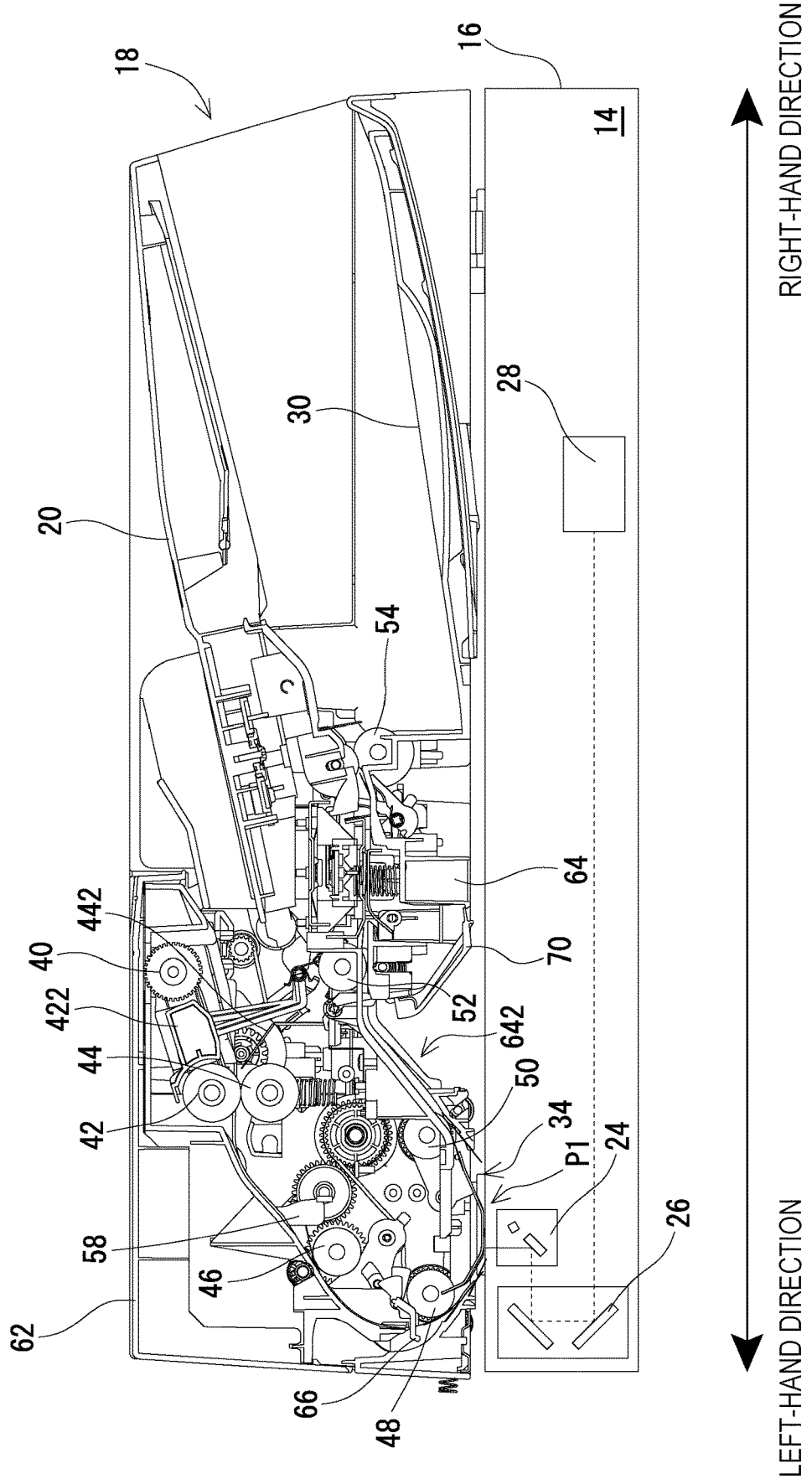
FIG. 3 is a schematic sectional view of the internal structure of the original-document-feeding apparatus with the lid opened.

An image-reading unit 14 including an original-document-feeding apparatus according to a first embodiment of the present disclosure and an image-forming apparatus 10 including the image-reading unit will hereinafter be described with reference, where appropriate, to the drawings. FIG. 1 illustrates an internal structure of the image-forming apparatus 10 including an original-document-feeding apparatus 22, which is an example of the original-document-feeding apparatus. FIG. 2 is a schematic sectional view of an internal structure of the original-document-feeding apparatus 22 with a lid 70 closed. FIG. 3 is a schematic sectional view of the internal structure of the original-document-feeding apparatus 22 with the lid 70 opened.

Referring to FIG. 1 to FIG. 3, the image-forming apparatus 10, for which the present disclosure can be used, is a full-color multifunction peripheral (MFP) that has a copy function, a print function, a scan function, and a fax function. However, the image-forming apparatus, for which the present disclosure can be used, is not limited to the embodiment provided that the image-forming apparatus has at least the scan function.

In the description, the upward and downward directions (vertical directions) of the image-forming apparatus 10 and components thereof are defined as the upward and downward directions of the page in FIG. 1. Of horizontal directions when the image-forming apparatus 10 is viewed from the front, the left-hand direction facing the page is defined as the left-hand direction of the page, and the right-hand direction facing the page is defined as the right-hand direction of the page. Of depth directions when the image-forming apparatus 10 is viewed from above (or below), the direction toward the front face of the image-forming apparatus 10 is defined as the forward direction (frontward direction) of the page, and the direction toward the back face of the image-forming apparatus 10 is defined as the backward direction (rearward direction) of the page.

The image-forming apparatus 10 includes a body 12 and the image-reading unit 14 that is disposed on the top of the body 12. A control unit 102 that controls the operation of the components of the image-forming apparatus 10 is disposed at a predetermined position in the body 12. The control unit 102 includes a CPU, a memory, and other components and sends control signals to the components of the image-forming apparatus 10 for various operations of the image-forming apparatus 10 in response to inputs into an operation unit (not illustrated) including a touch screen, an operation button, and other components.

An image-forming unit 78 includes an exposure unit 80, a development unit 82, a photosensitive drum 84, a cleaning unit 86, a charging unit 88, an intermediate transfer belt unit 90, a transfer roller (secondary transfer roller) 92, a fixing unit 94, and other components. The image-forming unit 78 forms an image on a sheet (recording paper) that is conveyed from a sheet feed cassette 96 or a sheet manual-feed cassette 98 and discharges the sheet on which the image is formed to a discharge tray. Image data that is read by the image-reading unit 14, image data that is sent from an external computer, or other image data is used as image data for forming the image on the sheet.

In the body 12, a first sheet conveyance passage S1 is formed. A sheet that is placed in the sheet feed cassette 96 or the sheet manual-feed cassette 98 is conveyed along the first sheet conveyance passage S1 to the discharge tray via a resistance roller 114, the transfer roller 92, and the fixing unit 94. In addition, a second sheet conveyance passage S2 is formed therein. In the case where duplex printing is performed on a sheet, after simplex printing is finished, and the sheet passes through the fixing unit 94, the sheet returns to the first sheet conveyance passage S1 at a position upstream of the transfer roller 92 in the direction in which the sheet is conveyed. On the first sheet conveyance passage S1 and the second sheet conveyance passage 32, conveyance rollers 116 are appropriately disposed to supplementary generate the thrust of the sheet.

In the case where the image forming apparatus 10 performs simplex printing, a sheet that is placed in the sheet feed cassette 96 or the sheet manual-feed cassette 98 is guided to the first sheet conveyance passage S1 by a pickup roller 118. The sheet is conveyed by the corresponding conveyance roller 116 to the resistance roller 114. The sheet is conveyed by the resistance roller 114 to the transfer roller 92 with a timing with which the position of a front edge of the sheet matches the front position of the image data on an intermediate transfer belt, and a toner image is transferred to the sheet. Subsequently, when the sheet passes through the fixing unit 94, unfixed toner on the sheet is melted by heat and fixed. The sheet passes through the corresponding conveyance roller 116 and is discharged to the discharge tray (not illustrated).

In the case where duplex printing is performed, when a rear-edge portion of a sheet reaches the conveyance roller 116 near the discharge tray after the simplex printing is finished and the sheet passes through the fixing unit 94, the rotation direction of the conveyance roller 116 is reversed, the movement direction of the sheet is reversed, and the sheet is guided to the second sheet conveyance passage S2. The sheet guided to the second sheet conveyance passage S2 is conveyed by the corresponding conveyance rollers 116 along the second sheet conveyance passage S2 and guided to the first sheet conveyance passage S1 at a position upstream of the resistance roller 114 in the direction in which the sheet is conveyed. At this time, the sheet is reversed. Subsequently, when the sheet passes through the transfer roller 92 and the fixing unit 94, an image is formed on the back surface of the sheet.

The image-reading unit 14 includes an original-document-loading portion 16 and an original-document-pressing cover 18. The original-document-loading portion 16 includes a housing including an original-document-loading table 16a that is composed of a transparent material and that serves as the upper surface thereof. The operation unit (not illustrated) such as a touch screen or an operation button that receives user inputs is disposed on the front surface of the housing of the original-document-loading portion 16.

As illustrated in FIG. 1 to FIG. 3, an imaging unit 28 is disposed in the housing of the original-document-loading portion 16, and the imaging unit 28 includes a light source unit 24 that includes LEDs arranged in, for example, first scanning directions (directions perpendicular to the page in FIG. 1, FIG. 2, and FIG. 3) and that is movable in second scanning directions (directions parallel to the page in FIG. 1, FIG. 2, and FIG. 3), a mirror unit 26 that is movable in the second scanning directions at half the speed at which the light source unit 24 moves, an imaging lens, a line sensor, and other components. The image-reading unit 14 exposes a surface of an original document to light by using the light source unit 24 and guides light reflected from the surface of the original document to the imaging lens (not illustrated) of the imaging unit 28 by using the mirror unit 26. The imaging lens images the reflected light on the light-receiving element of the line sensor (not illustrated). The line sensor detects luminance and chromaticity of the reflected light that is imaged on the light-receiving element, and image data based on an image on the surface of the original document is generated. Examples of the line sensor include a COD (Charge Coupled Device) and a CIS (Contact Image Sensor).

The original-document-pressing cover 18 is mounted on the top of the original-document-loading portion 16 so as to be openable and closeable with hinges 182 (see FIG. 8 and FIG. 9) or other components interposed therebetween. An ADF 22, which is an example of the original-document-feeding apparatus, as mounted on the original-document-pressing cover 18. The ADF 22 automatically feeds one or more original documents that are placed on an original-document-loading tray 20 one by one to a read position (image-read position) P1 (see FIG. 2 and FIG. 3) at which image-read glass is disposed, and conveys each original document to a discharge tray 30 beyond the read position P1.

In the image-reading unit 14, as illustrated in FIG. 2 and FIG. 3, a predetermined home position (read position P1) of the light source unit 24 is set. When the image-reading unit 14 reads in an original-document movement method (method by which the image of the original document that is placed on the original-document-loading tray 20 is read), the original document that is conveyed by the original-document-feeding apparatus 22 in the second scanning directions is irradiated with light that is emitted from the light source unit 24 with the light source unit 24 being stationary at the read position P1 when the original document passes through the read position P1, the image on the surface of the original document is read, and the image data thereof is obtained. In the case of a fixation reading method (method by which the image of an original document that is placed on the original-document-loading table 16a is read), the light source unit 24 and the mirror unit 26 are moved in the second scanning directions to read the image on the surface of the original document that is placed on the original-document-loading table 16a, and the image data thereof is obtained.

The structure of the original-document-feeding apparatus 22 will now be described in detail with reference to FIG. 2 and FIG. 3. The term "upstream" or "downstream" in the description means "upstream" or "downstream" with respect to the direction (original-document conveyance direction) in which the original-document-feeding apparatus 22 conveys each original document.

The original-document-pressing cover 18 includes a first member 62 corresponding to approximately upper half of the original-document-pressing cover 18 (the original-document-feeding apparatus 22) and a second member (corresponding to the conveyance-passage forming member) 64 corresponding to approximately lower half of the original-document-pressing cover 18 (the original-document-feeding apparatus 22). Components that are included in the original-document-feeding apparatus 22 are mounted on the first member 62 or the second member 64.

The original-document-loading tray 20 on which the original document is placed is included in the first member 62. The discharge tray 30 to which the original document is discharged is included in the second member 64. The first member 62 and the second member 64 form an original-document conveyance passage alone which the original document is conveyed. The original-document conveyance passage includes a first conveyance passage 32 along which the original document that is placed on the original-document-loading tray 20 is conveyed to the read position P1, and a second conveyance passage 34 along which the original document is conveyed to the discharge tray 30 after the original document passes through the read position P1.

The original document is placed on the original-document-loading tray 20 with the front surface facing up. A pair of side guides that are movable in width directions (left-hand and right-hand directions with respect to the original-document conveyance direction) are disposed on the upper surface of the original-document-loading tray 20. The side guides are used to restrict the position of the original document that is placed on the original-document-loading tray 20 in both of the width directions such that the original document is in position. The original-document-loading tray 20 is located away from the read position P1 in the right-hand direction. The read position P1 is a freely-selected position away from the center of the image-reading unit 14 in the left-hand direction (for example, the position of a left-hand edge portion of the original-document-loading table 16a). During reading in the original-document movement method, light is emitted from the light source unit 24 via original-document-read glass 38 at the read position P1.

The discharge tray 30 is disposed below the original-document-loading tray 20. The original document is discharged to the discharge tray 30 with the front surface facing down. The discharge tray 30 is disposed away from the read position P1 in the right-hand direction. That is, the discharge tray 30 and the original-document-loading tray 20 are disposed away from the read position P1 in the same direction (right-hand direction) with respect to the second scanning directions.

The original-document conveyance passage that includes the first conveyance passage 32 and the second conveyance passage 34 has a substantially U-shape when viewed from the front. Specifically, the first conveyance passage 32 extends from the original-document-loading tray 20, which is located away from the read position P1 in the right-hand direction and above the read position P1, to a position away from the read position P1 in one direction (left-hand direction) via an area above the read position P1. The first conveyance passage 32 starts to extend downward at the position away from the read position P1 in the one direction (left-hand direction) and extends to the read position P1 in the other direction (right-hand direction). That is, the first conveyance passage 32 extends across the area above the read position P1, bends downward, and extends toward the read position P1. In other words, the first conveyance passage 32 has a J-shape turned facedown when viewed from the front.

The second conveyance passage 34 is connected to a lower portion of the first conveyance passage 32 and extends from the read position P1 to the discharge tray 30 in the other direction (right-hand direction).

A pickup roller 40, a sheet-feeding roller 42, a separation roller 44, a conveyance roller 46, and a conveyance roller 46 are disposed in order from the uppermost position on the first conveyance passage 32. A conveyance roller (corresponding to a second conveyance roller) 50, a conveyance roller (corresponding to a first conveyance roller) 52, and a discharge roller 54 are disposed in order from the uppermost position on the second conveyance passage 34.

The pickup roller 40 is disposed near the upper surface of the first conveyance passage 32 and the original-document-loading tray 20 such that the pickup roller 40 is movable in the upward and downward directions. The pickup roller 40 feeds one or more original documents that are placed on the original-document-loading tray 20 in order from above to the inside of the original-document-feeding apparatus 22 (the first conveyance passage 32).

The sheet-feeding roller 42 is disposed downstream of the pickup roller 40 and near the upper surface of the first conveyance passage 32 and the pickup roller 40. The sheet-feeding roller 42 feeds the original document to the first conveyance passage 32 after the original document is fed by the pickup roller 40 from the original-document-loading tray 20. The original-document-feeding apparatus 22 includes a pickup holder 422 that supports the pickup roller 40 and the sheet-feeding roller 42 and that is mounted on the first member 62 such that the pickup holder 422 is movable in the upward and downward directions. The pickup roller 40 is supported by the pickup holder 422 so as to be movable in the upward and downward directions about the rotation axis of the sheet-feeding roller 42.

The separation roller 44 is disposed below the sheet-feeding roller 42 with the first conveyance passage 32 interposed therebetween. The separation roller 44 is disposed to inhibit plural original documents that are stacked from being conveyed to the first conveyance passage (multi feeding). For example, the separation roller 44 is composed of a material having a high coefficient of friction such as a urethane resin. As illustrated in FIG. 2 and FIG. 3, the separation roller 44 is urged upward by a compression spring such that the separation roller 44 is in contact with the outer circumferential surface of the sheet-feeding roller 42 at a predetermined pressure (disjoining pressure). The coefficient of friction between the surface of the separation roller 44 and the original document is smaller than the coefficient of friction between the outer circumferential surface of the sheet-feeding roller 42 and the original document and is larger than the coefficient of friction between the original documents. A torque limiter may be provided to apply a predetermined rotational load to the separation roller 44 although this is not illustrated. In the case where the torque limiter is provided, the separation roller 44 does not rotate when the torque is a predetermined value or less.

The original-document-feeding apparatus 22 includes a guiding member (guiding sheet) 442 that guides the original document that is placed on the original-document-loading tray 20 to a nip portion between the sheet-feeding roller 42 and the separation roller 44. The guiding sheet 442 is disposed upstream of the separation roller 44, is composed of a flexible material, and has a sheet shape. The guiding sheet 442 is inclined upward in the downstream direction.

The conveyance roller 46 is disposed on the first conveyance passage 32 downstream of the sheet-feeding roller 42 and the separation roller 44 and upstream of the conveyance roller 48. That is, the conveyance roller 46 is disposed between the sheet-feeding roller 42 and the conveyance roller 48 and between the separation roller 44 and the conveyance roller 48. The conveyance roller 46 conveys the original document to the conveyance roller 48 after the original document is conveyed by the pickup roller 40 and the sheet-feeding roller 42.

The conveyance roller 48 is disposed on the first conveyance passage 32 between the conveyance roller 46 anal the read position P1. Specifically, the conveyance roller 48 is disposed upstream of the read position P1 and near the read position P1. The conveyance roller 48 conveys the original document to the read position P1 after the original document is conveyed by the conveyance roller 46.

The conveyance roller 50 is disposed on the second conveyance passage 34 downstream of the read position P1 and upstream of the conveyance roller 52. That is, the conveyance roller 50 is disposed between the read position P1 and the conveyance roller 52. The conveyance roller 50 conveys the original document to the conveyance roller 52 after the original document passes through the read position P1.

The conveyance roller 52 is disposed on the second conveyance passage 34 between the conveyance roller 50 and the discharge roller 54. The conveyance roller 52 conveys the original document to the discharge roller 54 after the original document is conveyed by the conveyance roller 50.

The discharge roller 54 is disposed on the second conveyance passage 34 downstream of the conveyance roller 52. Specifically, the discharge roller 54 is disposed at the downstream end portion of the second conveyance passage 34. The discharge roller 54 conveys (discharges) the original document to the discharge tray 30 after the original document is conveyed by the conveyance roller 52.

The pickup roller 40 and the sheet-feeding roller 42 are rotated by a drive source such as a motor not illustrated. The separation roller 44 is rotated with rotation of the sheet-feeding roller 42.

Each of the conveyance rollers 46, 48, 50, and 52 and the discharge roller 54 includes a drive roller that is rotated by a drive source and a driven roller that is rotated with rotation of the drive roller. The drive rollers of the conveyance rollers 46, 46, 50, and 52, the driven roller of the conveyance roller 46, and the driven roller of the discharge roller 54 are mounted on the first member 62. The driven rollers of the conveyance rollers 48, 50, and 52, and the drive roller of the discharge roller 54 are mounted on the second member 64.

The sheet-feeding roller 42, the conveyance rollers 46, 48, 50, and 52, and the discharge roller 54 are arranged at regular intervals. Specifically, the distances (distances along the first conveyance passage 32 or the second conveyance passage 34) from the sheet-feeding roller 42, the conveyance rollers 46, 48, 50, and 52, and the discharge roller 54 to the corresponding rollers adjacent thereto are shorter than the minimum size (for example, a business card size) or length, in the original-document conveyance direction, of the original document that is conveyed by the original-document-feeding apparatus 22.

A lever 58 is disposed upstream of the conveyance roller 46 and near the conveyance roller 46 so as to be swingable. A lever 66 is disposed upstream of the conveyance roller 48 and near the conveyance roller 48 so as to be swingable. A lever 72 is disposed upstream of the conveyance roller 52 and near the conveyance roller 52 (between the conveyance roller 50 and the conveyance roller 52) so as to be swingable (see FIG. 4 and FIG. 5). The lever 58 and the lever 66 are disposed so as to block the first conveyance passage 32. The lever 58 and the lever 66 are pushed and swung by the original document when the original document is conveyed along the first conveyance passage 32. The lever 72 is disposed between the conveyance roller 50 and the conveyance roller 52 so as to block the second conveyance passage 34. The lever 72 is pushed and swung by the original document when the original document is conveyed along the second conveyance passage 34.

Sensors (not illustrated) that detect that the lever 58, the lever 66, or the lever 72 is pushed and swung are disposed near the lever 58, the lever 66, and the lever 72. An example of each sensor is a photo interrupter. The control unit 102 (see FIG. 1) determines whether the original document is located upstream of the conveyance roller 46 and near the conveyance roller 46, whether the original document is located upstream of the conveyance roller 48 and near the conveyance roller 48, or whether the original document is located upstream of the conveyance roller 52 and near the conveyance roller 52 in accordance with the outputs of the sensors. That is, the position of the original document that is conveyed along the first conveyance passage 32 and the second conveyance passage 34 is detected as a result of the lever 72 being pushed and swung.

In the original-document-feeding apparatus 22 having the above structure, the original document is conveyed by the conveyance rollers to the read position P1 along the first conveyance passage 32 after the original document is fed by the pickup roller 40 and the sheet-feeding roller 42 to the first conveyance passage 32. While the original document is conveyed through the read position P1, the image-reading unit 14 reads the image on the surface of the original document. The original document is conveyed along the second conveyance passage 34 after the original document passes through the read position P1 and discharged to the discharge tray 30.

In an existing image-reading apparatus, a swingable member is mounted on a lower passage downstream of a read position so as to be swingable with respect to the housing of an original-document-pressing cover. The position of the swingable member changes into an open position by the own weight when the original-document-pressing cover is opened and changes into a close position by the own weight when the original-document-pressing cover is closed. The swingable member functions as a wall surface that defines the entire width of the lower passage while being at the close position. While the swingable member is at the open position, access to the lower passage is partly allowed therefrom.

In the existing image-reading apparatus, however, the entire width of the lower passage is defined by the swingable member. Accordingly, the mechanical strength of a conveyance passage is not sufficient, and there is a problem in that a conveyance failure occurs due to strain of the conveyance passage, for example, such that an original document that is conveyed is obliquely fed.

In view of this, according to the first embodiment, the second member 64 has an opening 642 from which access to the second conveyance passage 34 is partly allowed. This ensures the mechanical strength or stiffness of the conveyance passage and enables a residual piece of paper or other substances on toe conveyance passage for the original document to be readily removed.

Figure 4:
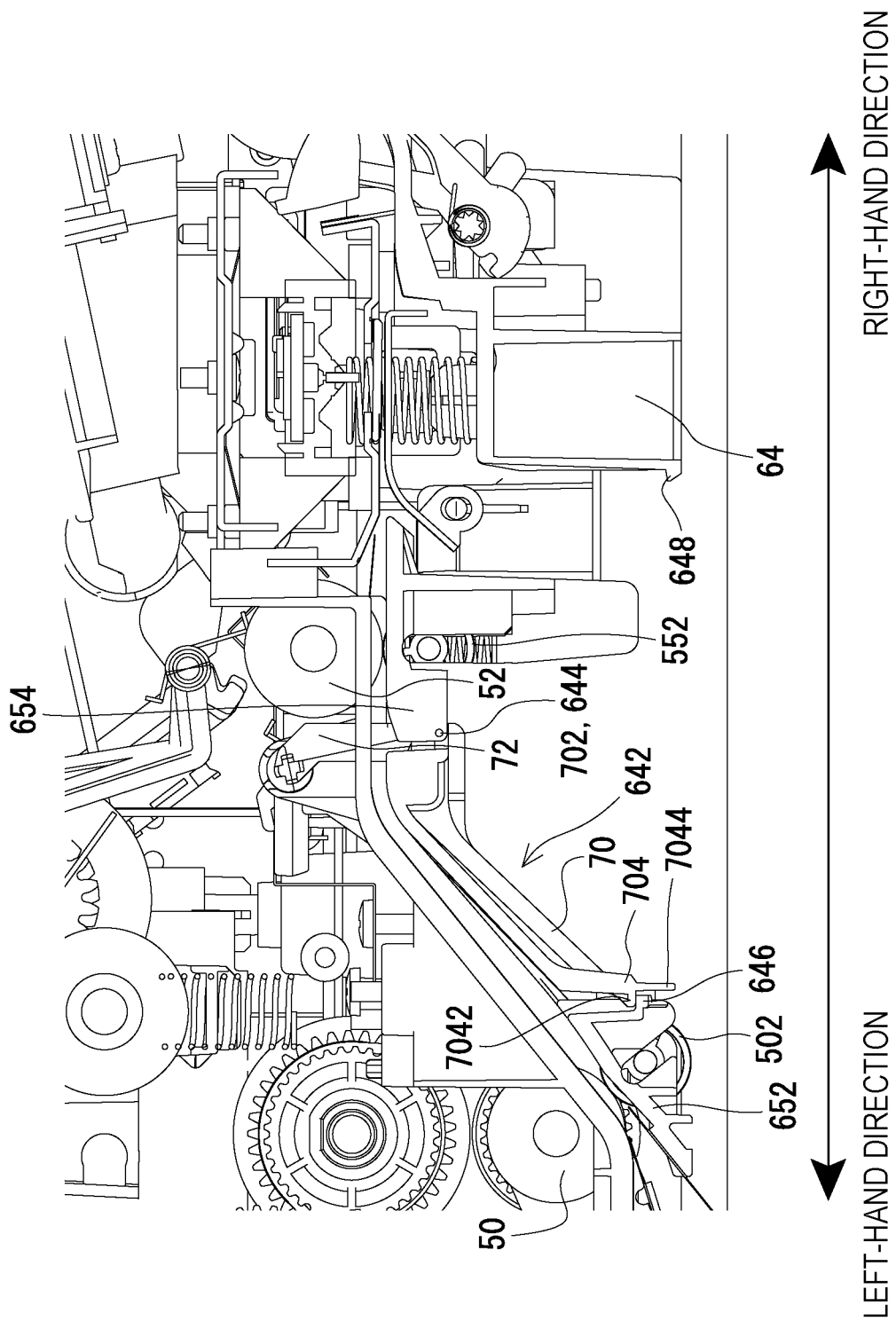
FIG. 4 schematically illustrates an enlarged sectional view of a part of the internal structure of the original-document-feeding apparatus with the lid closed.
Figure 5:
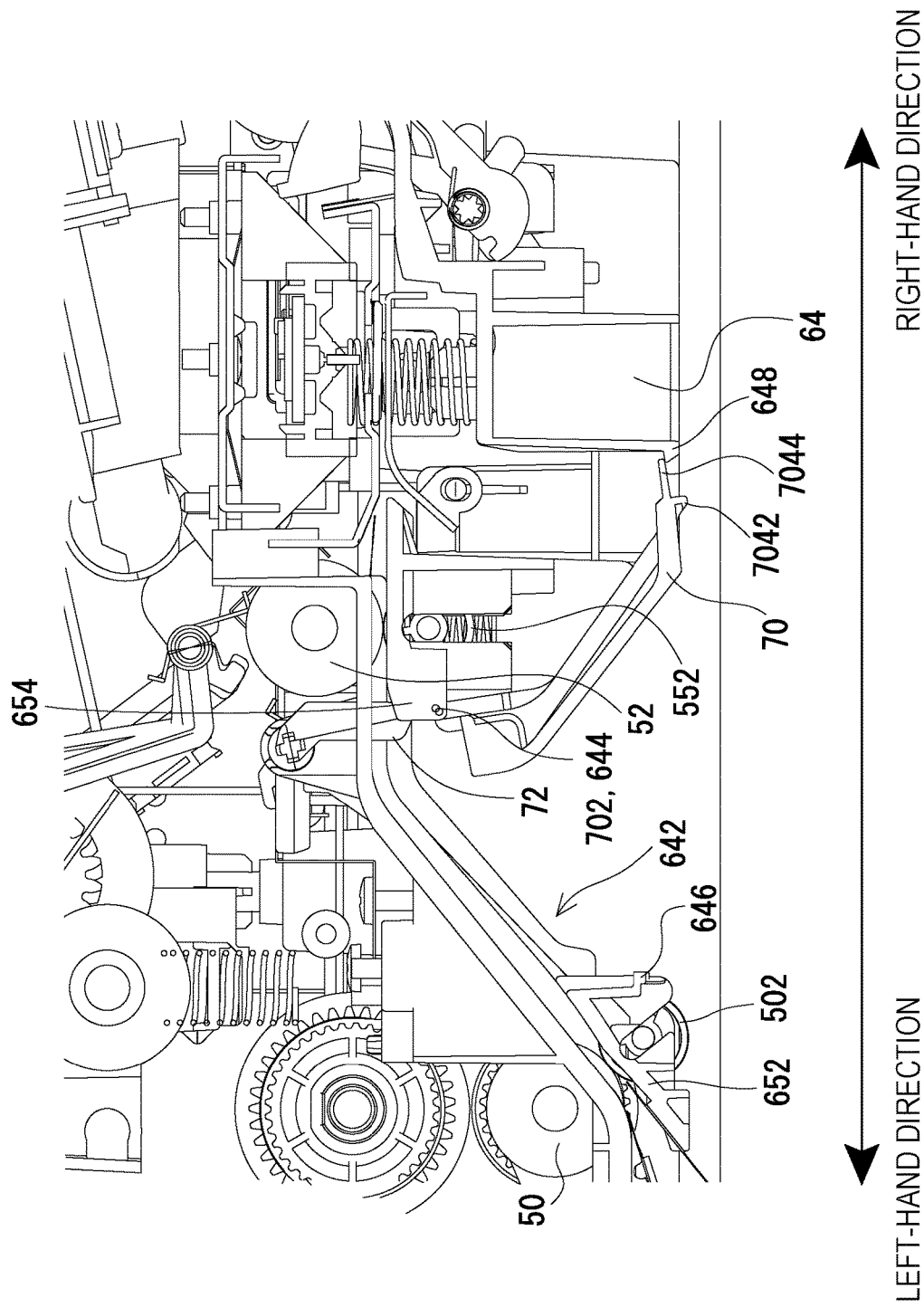
FIG. 5 schematically illustrates an enlarged sectional view of a part of the internal structure of the original-document-feeding apparatus with the lid opened.
Figure 6:
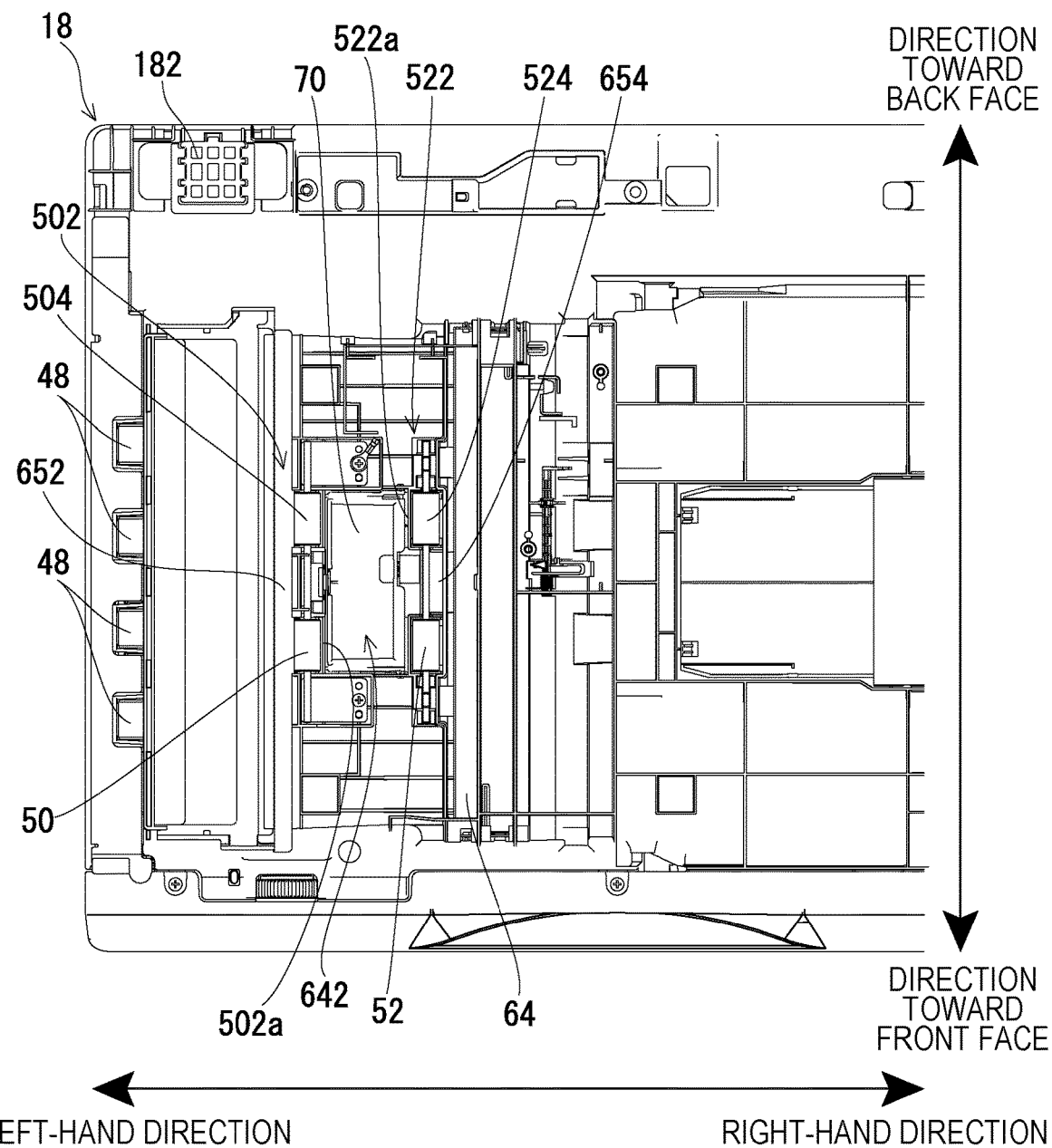
FIG. 6 illustrates the original-document-feeding apparatus viewed from below with the lid closed.
Figure 7:
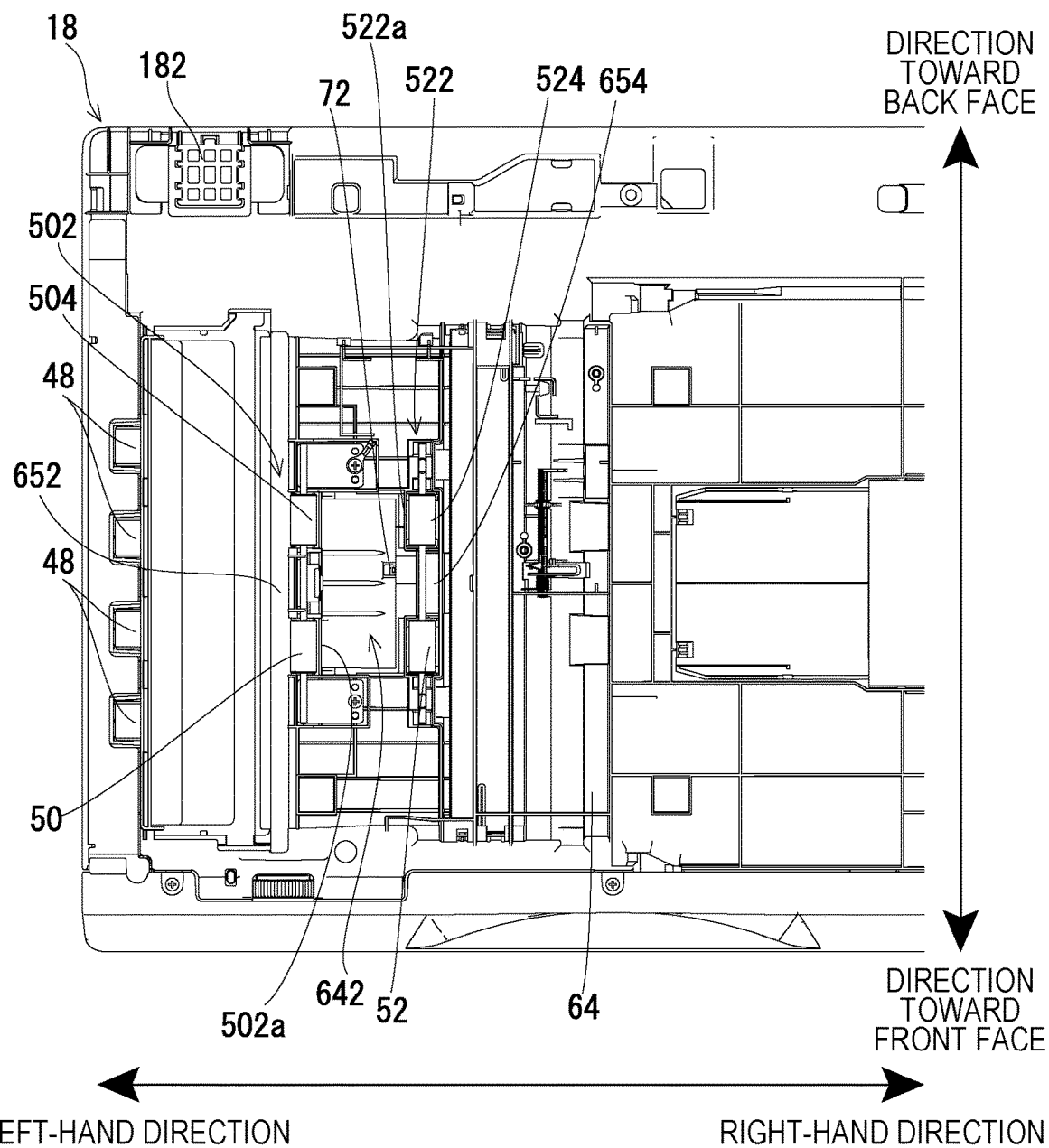
FIG. 7 illustrates the original-document-feeding apparatus viewed from below with an illustration of the lid omitted.
Figure 8:
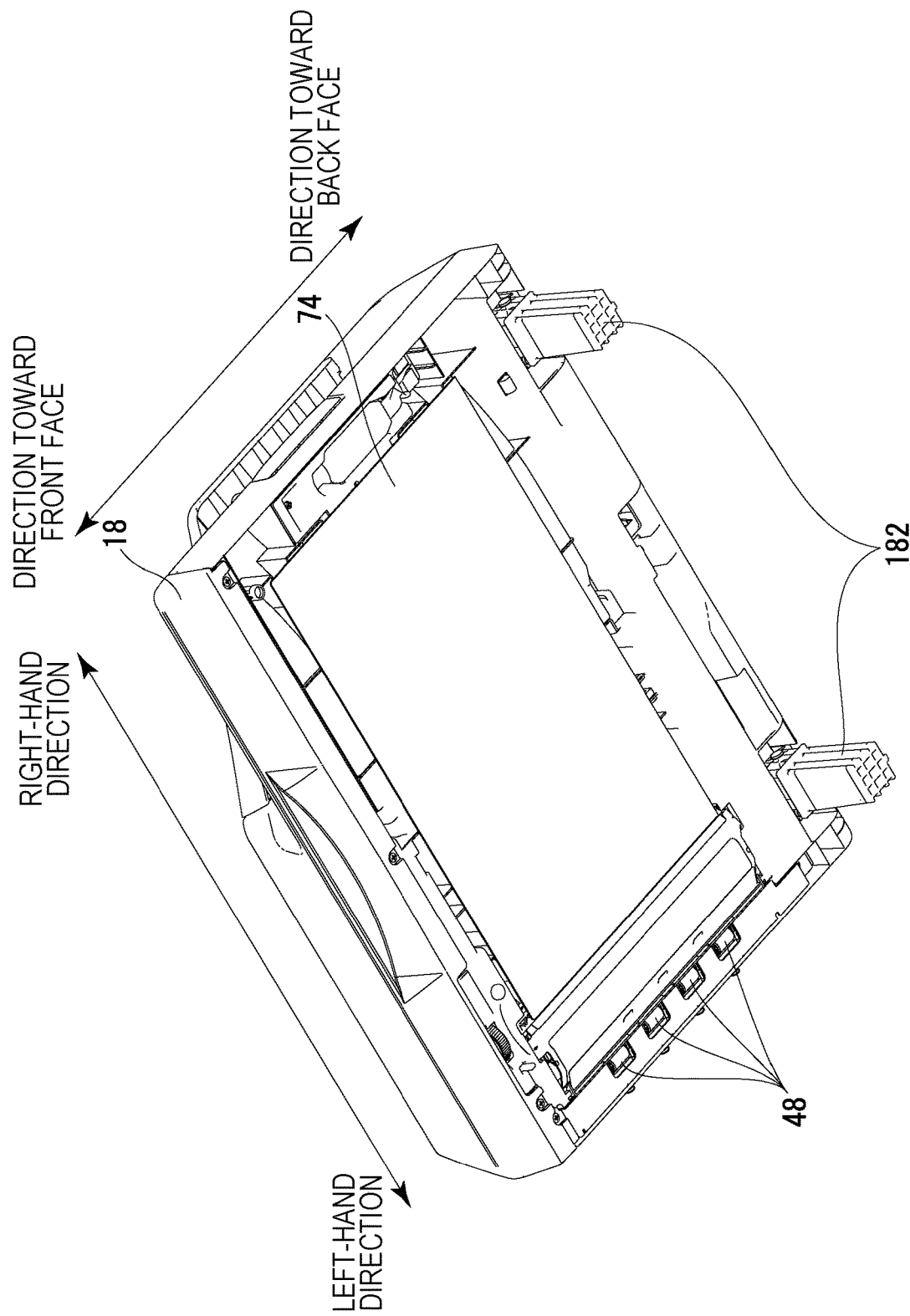
FIG. 8 is a perspective view of the structure of an image-reading unit with a sheet member mounted.
Figure 9:
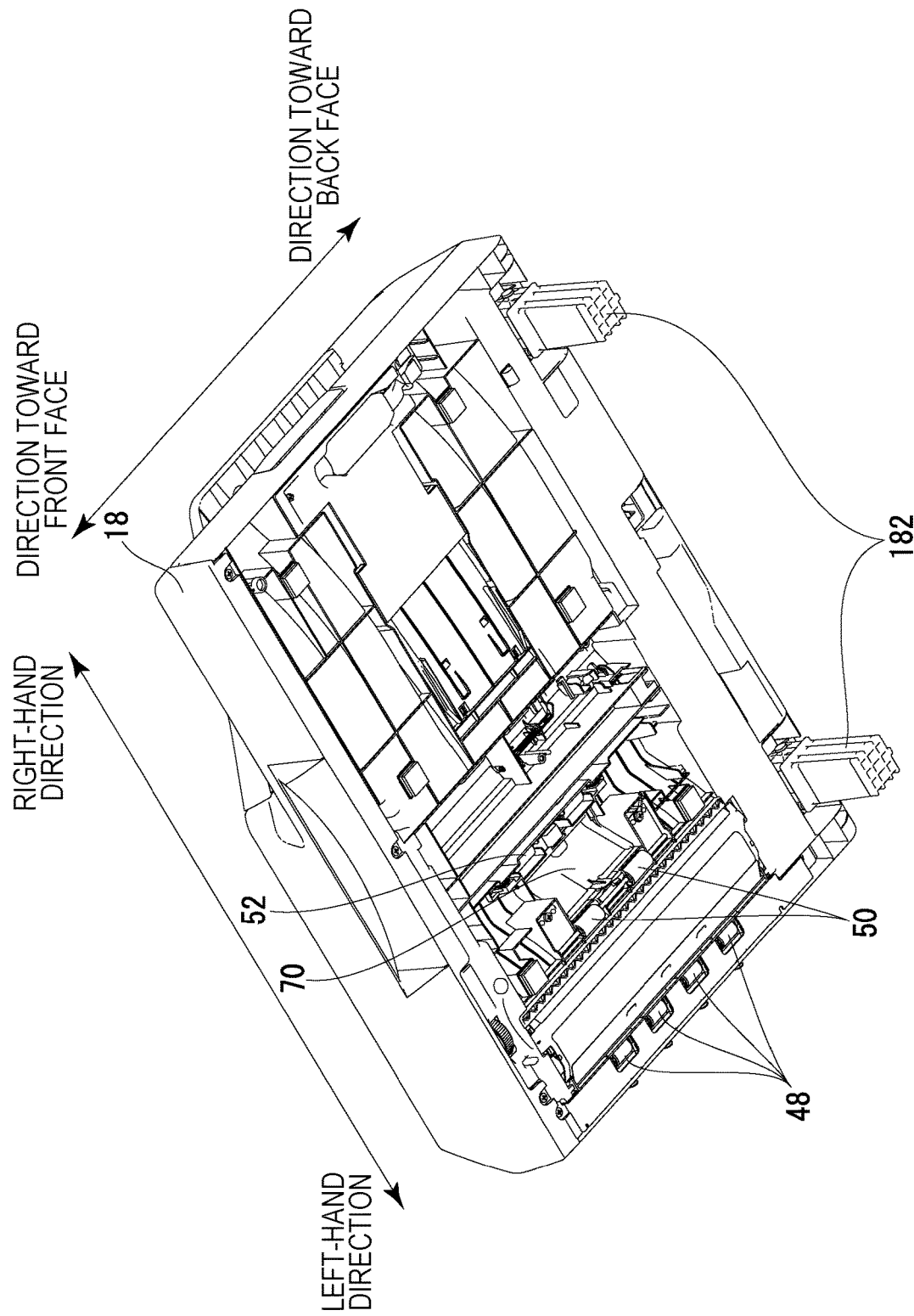
FIG. 9 is a perspective view of the structure of the image-reading unit with an illustration of the sheet member omitted.

FIG. 4 schematically illustrates an enlarged sectional view of a part of the internal structure of the original-document-feeding apparatus 22 with the lid closed. FIG. 5 schematically illustrates an enlarged sectional view of a part of the internal structure of the original-document-feeding apparatus 22 with the lid opened. FIG. 6 illustrates the original-document-feeding apparatus 22 viewed from below with the lid 70 closed. FIG. 7 illustrates the original-document-feeding apparatus 22 viewed from below with an illustration of the lid 70 omitted. FIG. 8 is a perspective view of the structure of the original-document-feeding apparatus 22 with a sheet member 74 mounted. FIG. 9 is a perspective view of the structure of the original-document-feeding apparatus 22 with an illustration of the sheet member 74 is omitted.

As illustrated in FIG. 2 to FIG. 7, the second member 64 has the opening 642 from which access to the second conveyance passage 34 is partly allowed.

Specifically, as illustrated in FIG. 2 to FIG. 5, the opening 642 may be located downstream of the conveyance roller 50 in the original-document conveyance direction. More specifically, the opening 642 is located between the conveyance roller 50 and the conveyance roller 52 in the original-document conveyance direction. The phrase "between the conveyance roller 50 and the conveyance roller 52" means "at least between the rotation axis of the conveyance roller 50 and the rotation axis of toe conveyance roller 52".

As illustrated in FIG. 4 to FIG. 7, the opening 642 does not overlap the rollers (the drive roller and the driven roller) of the conveyance roller 50 and the conveyance roller 52 when viewed from below (or above).

The second member 64 includes a roller support 502 that supports a driver roller 504 of the conveyance roller 50 and a roller support 552 that supports a driven roller 524 of the conveyance roller 52. The roller support 502 and the roller support 552 include, for example, a bearing and a pressing member. The roller support 502 is disposed on a window frame 652 of the second member 64 upstream of the opening 642. The roller support 552 is disposed on a window frame 654 of the second member 64 downstream of the opening 642.

As illustrated in FIG. 6 and FIG. 7, the roller support 502 (the upstream window frame 652) includes a wall (rib) 502a that covers a part or the whole of the right-hand surface (downstream portion in the original-document conveyance direction) of the driven roller 504 of the conveyance roller 50. The roller support 552 (the downstream window frame 654) includes a wall (rib) 522a that covers a part or the whole of the left-hand surface (upstream portion in the original-document conveyance direction) of the driven roller 524 of the conveyance roller 52.

The opening 642 is thus located between the roller support 502 (the upstream window frame 652) and the roller support 552 (the downstream window frame 654) when viewed from below (or above). Specifically, the opening 642 is located between the wall 502a that covers the right-hand surface of the driven roller 504 of the conveyance roller 50 and the wall 522a that covers the left-hand surface of the driven roller 524 of the conveyance roller 52 when viewed from below (or above).

The opening 642 has a substantially rectangular shape when viewed from below (or above). The size of the opening 642 in the width directions (left-hand and right-hand directions with respect to the original-document conveyance direction) is smaller than at least the size of the original-document conveyance passage (the second conveyance passage 34) in the width directions. The size of the opening 642 in the width directions is smaller than the maximum size or length, in the width directions, of the original document that is conveyed by the original-document-feeding apparatus 22.

The opening 642 is located at a position depending on the conveyance roller 50 and the conveyance roller 52 in the width directions. Specifically, the edge portion of the opening 642 near the front face is substantially aligned with the end portion of the conveyance roller 50 (the driven roller 504) near the front face and the end portion of the conveyance roller 52 (the driven roller 524) near the front face. The edge portion of the opening 642 near the back face is substantially aligned with the end portion of the conveyance roller 50 (the driven roller 504) near the back face and the end portion of the conveyance roller 52 (the driven roller 524) near the back face. That is, the opening 642 extends in the width directions between the end portions of the conveyance roller 50 (the driven roller 504) and the conveyance roller 52 (the driven roller 524) near the front face and the end portions of the conveyance roller 50 (the driven roller 504) and the conveyance roller 52 (the craven roller 524) near the back face. In other words, nip portions of the conveyance roller 50 and the conveyance roller 52 are included within the range of the opening 642 in the width directions.

Ribs that extend from inner walls along opening edges that define the opening 642 toward the center of the opening 642 are formed around the opening 642 although this is difficult to see in the figures. The ribs are formed at least along the opening edge near the front face and the opening edge near the back face that define the opening 642 (both edge portions in the width directions of the original document that is conveyed along the second conveyance passage 34). Specifically, the rib near the front face extends from the inner wall near the front face, which is along the opening edge that defines the opening 642, toward the back face. The rib near the back face extends from the inner wall near the back face, which is along the opening edge that defines the opening 642, toward the front face. The ribs enable the strength or stiffness of the second member 64 having the opening 642 to be increased.

The second member 64 includes the lid 70 for covering the opening 642. The lid 70 can open and close the opening 642. The lid 70 is composed of a synthetic resin, has a shape (substantially rectangular shape) having edges corresponding to the opening edges that define the opening 642, and is fitted into the opening 642.

The structure of the lid 70 that is mounted on the second member 64 will be described. In the description, an upstream direction with respect to the original-document conveyance direction when the lid 70 is mounted on the second member 64 and covers the opening 642 (when the lid 70 is closed) is defined as the upstream direction from the lid 70, and a downstream direction with respect to the original-document conveyance direction when the lid 70 is mounted on the second member 64 and covers the opening 642 is defined as the downstream direction from the lid 70.

As illustrated in FIG. 4 and FIG. 5, the lid 70 includes rotating shafts 702 and an engagement portion 704. The rotating shafts 702 are disposed on the downstream edge portion of the lid 70 and are two columnar projections (shafts) that are formed on side surfaces (the side surface near the front face and the side surface near the back face) thereof in the width directions. That is, the shafts are formed on the side surface of the lid 70 near the front face and the side surface thereof near the back face. The two shafts are concentrically formed.

Recessed portions (bearing portions) 644 that function as bearings are formed in the inner walls along the opening edges that define the opening 642 at positions corresponding to the positions of the rotating shafts 702, although this is difficult to see in the figures. For example, the bearing portions 644 are formed as columnar holes in downstream edge portions of the left and right inner walls in the original-document conveyance direction along the opening edges that define the opening 642.

The rotating shafts 702 are fitted into the bearing portions 644 such that the lid 70 is mounted on the second member 64 so as to be swingable.

The engagement portion 704 is disposed on the upstream edge portion of the lid 70 and disposed at the center or substantially the center of the lid 70 in the width directions. The engagement portion 704 includes a first engagement pawl 7042 and a second engagement pawl 7044. The first engagement pawl 7042 projects in the upstream direction from the upstream side surface of the lid 70. The second engagement pawl 7044 projects downward from the upstream edge portion of the lid 70.

The second member 64 includes a first engagement piece 646 that is paired with the first engagement pawl 7042 and a second engagement piece 648 that is paired with the second engagement pawl 44.

The first engagement piece 646 is formed on the upstream inner wall along the opening edge (the upstream window frame 652) that defines the opening 642. The first engagement, piece 646 is disposed at a position corresponding to the position of the first engagement pawl 7042 with the lid 70 closed and projects in the downstream direction from the position. The first engagement piece 646 and the first engagement pawl 7042 are located such that the first engagement pawl 7042 and the first engagement piece 646 slightly interfere with each other in the upward and downward directions with the first engagement pawl 7042 engaged with the first engagement piece 646. Accordingly, as illustrated in FIG. 4, while the first engagement pawl 7042 is engaged with the first engagement piece 646, the lid 70 is inhibited from swinging in the upstream direction (counter clockwise direction in FIG. 4) with the lid 70 closed. That is, the lid 70 is held while remaining closed. When the original-document-feeding apparatus 22 is used, the first engagement pawl 7042 is engaged with the first engagement piece 646, and the lid 70 remains closed.

The second engagement piece 648 is disposed on the lower surface of the second member 64 at a certain position downstream of the conveyance roller 52. The second engagement piece 648 is disposed at a position corresponding to the position of the second engagement pawl 7044 with the lid 70 opened and projects in the upstream direction from the position. The second engagement piece 648 and the second engagement pawl 7044 are located such that the second engagement pawl 7044 and the second engagement piece 648 slightly interfere with each other in the upward and downward directions with the second engagement pawl 7044 engaged with the second engagement piece 648. Accordingly, as illustrated in FIG. 5, while the second engagement pawl 7044 is engaged with the second engagement piece 646, the lid 70 is inhibited from swinging in the downstream direction (clockwise direction in FIG. 5) with the lid 70 opened (with access to the second conveyance passage 34 allowed). That is, the lid 70 is held while remaining opened.

As illustrated in FIG. 5, access to the second conveyance passage 34 is allowed (exposure) with the lid 70 opened, and a residual piece of paper or other substances on the second conveyance passage 34 can be removed therefrom. As illustrated in FIG. 8, the sheet member 74 is disposed on the lower surface (lower surface of the second member 64) of the original-document-feeding apparatus 22 and comes into contact with the original document that is placed on the original-document-loading table 16a when the original-document-pressing cover 18 is closed. Accordingly, as Illustrated in FIG. 9, access to the second conveyance passage 34 is allowed when the lid 70 is opened after the sheet member 74 is removed from the lower surface of the original-document-feeding apparatus 22. At this time, the entire sheet member 74 may be removed from the lower surface of the original-document-feeding apparatus 22, or a part (for example, left half) of the sheet member 74 may be detached therefrom to such an extent that the lid 70 and the opening 642 are exposed.

Accordingly, an operator gains access to the second conveyance passage 34 by opening the lid 70 and can readily remove a residual piece of paper or other substances on the second conveyance passage 34. At this time, the lid 70 is held while remaining opened in a manner in which the lid 70 is swung in the downstream direction to engage the second engagement pawl 7044 with the second engagement piece 648. This facilitates work because access to the second conveyance passage 34 can be maintained. After the work is finished, the 70 is swung in the upstream direction to engage the first engagement pawl 7042 with the first engagement piece 646. This enables the lid 70 that is closed to cover the opening 642 (the original-document-feeding apparatus 22 is ready to be used).

As illustrated in FIG. 2 and FIG. 4, the upper surface of the lid 70 forms a part of the second conveyance passage 34 with the lid 70 closed. That is, the upper surface (surface near the second conveyance passage 34) of the lid 70 functions as a guide member that guides the original document that is conveyed along the second conveyance passage 34. The entire upper surface of the 70 may function as the guide member that guides the original document. Alternatively, a guide rib may be disposed on a part of the upper surface of the lid 70, and the upper surface of the guide rib may function as the guide member that guides the original document. The guide rib may include ribs each of which extends, for example, in the original-document conveyance direction. In this case, the ribs are arranged at regular intervals in the width directions (forward and backward directions) of the original document that is conveyed along the second conveyance passage 34. Since the original document is thus guided by the upper surface of the lid 70, a conveyance failure of the original document can be inhibited from occurring.

As illustrated in FIG. 7, the lever 72 may be disposed within the opening 642 to determine whether the original document is located upstream of the conveyance roller 52 and near the conveyance roller 52. For this reason, the lever 72 is exposed through the opening 642 with the lid 70 opened (with access to the second conveyance passage 34 allowed) when the original-document-feeding apparatus 22 is viewed from below. Accordingly, even when paper catches on the lever 72, a residual piece of the paper or other substances on the second conveyance passage 34 can be readily removed in a manner in which the lid 70 is opened to allow access to the second conveyance passage 34.

According to the first embodiment, since the second member 64 has the opening 642 from which access to the second conveyance passage 34 is partly allowed, the mechanical strength or stiffness of the second member 64 that forms the second conveyance passage 34 can be endured, and a residual piece of paper or other substances on the second conveyance passage 34 can be readily removed.

According to the first embodiment, since the opening 642 is located between the conveyance roller 50 and the conveyance roller 52 in the original-document conveyance direction, the size of the opening 642 can be minimized, and the mechanical strength or stiffness of the second member 64 that forms the second conveyance passage 34 can be endured.

According to the first embodiment, the rotating shafts 702 of the lid 70 are the projections (shafts), and the second member 64 (the inner walls along the opening edges that define the opening 642) includes the recessed portions (bearing portions) that are paired with the corresponding shafts. However, the lid 70 may include recessed portions (bearing portions), and the inner walls along the opening edges that define the opening 642 may include projections (shafts).

According to the first embodiment, the lid 70 includes the first engagement pawl 7042 and the second engagement pawl 7044, and the second member 64 includes the first engagement piece 646 that is paired with the first engagement pawl 7042 and the second engagement piece 648 that is paired with the second engagement pawl 7044. However, the lid 70 may include an engagement piece, and the second member 64 may include an engagement pawl that is paired with the engagement piece.

Second Embodiment

An image-forming apparatus 10 according to a second embodiment is the same as the image-forming apparatus 10 according to the first embodiment except that rotating shafts 702 of a lid 70 are disposed on an upstream portion thereof, an engagement portion 704 of the lid 70 is disposed on a downstream portion thereof, and the structure of the lid 70 that is mounted on the second member 64 is changed, and a duplicated description is omitted or simplified. Components that are common with those according to the above first embodiment are designated by like reference numbers for description.

Figure 10:
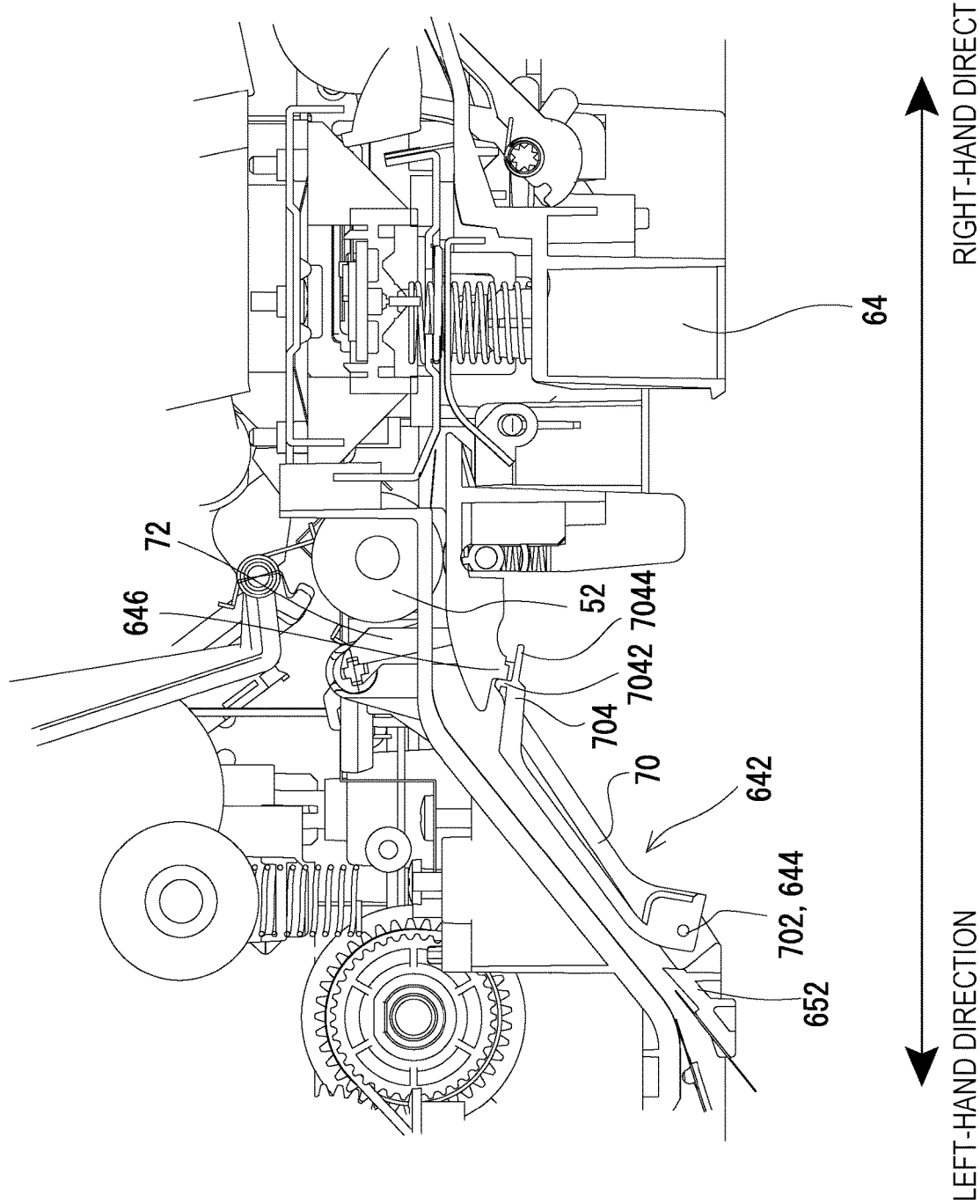
FIG. 10 is a schematic sectional view of an internal structure of an original-document-feeding apparatus according to a second embodiment with a lid closed.

FIG. 10 is a schematic sectional view of an internal structure of an original-document-feeding apparatus 22 according to the second embodiment. According to the second embodiment, as illustrated in FIG. 10, the rotating shafts 702 of the lid 70 are disposed on the upstream edge portion of the lid 70. The engagement portion 704 of the lid 70 is disposed on the downstream edge portion of the lid 70.

Bearing portions that are paired with the corresponding rotating shafts 702 of the lid 70 are formed in the upstream edge portions of the left and right inner walls in the original-document conveyance direction along the opening edges that define the opening 642 although this is difficult to see in the figures. The first engagement piece 646 that is paired with the first engagement pawl 7042 is formed downstream of the opening edges that define the opening 642.

According to the second embodiment, the mechanical strength or stiffness of the second member 64 that forms the second conveyance passage 34 can be endured, and a residual piece of paper or other substances on the second conveyance passage 34 can be readily removed as with the first embodiment.

Third Embodiment

A structure according to a third embodiment is the same as that according to the first embodiment except that the conveyance roller 50 is not provided, and a duplicated description is omitted or simplified. Components that are common with those according to the above first embodiment are designated by like reference numbers for description.

Figure 11:
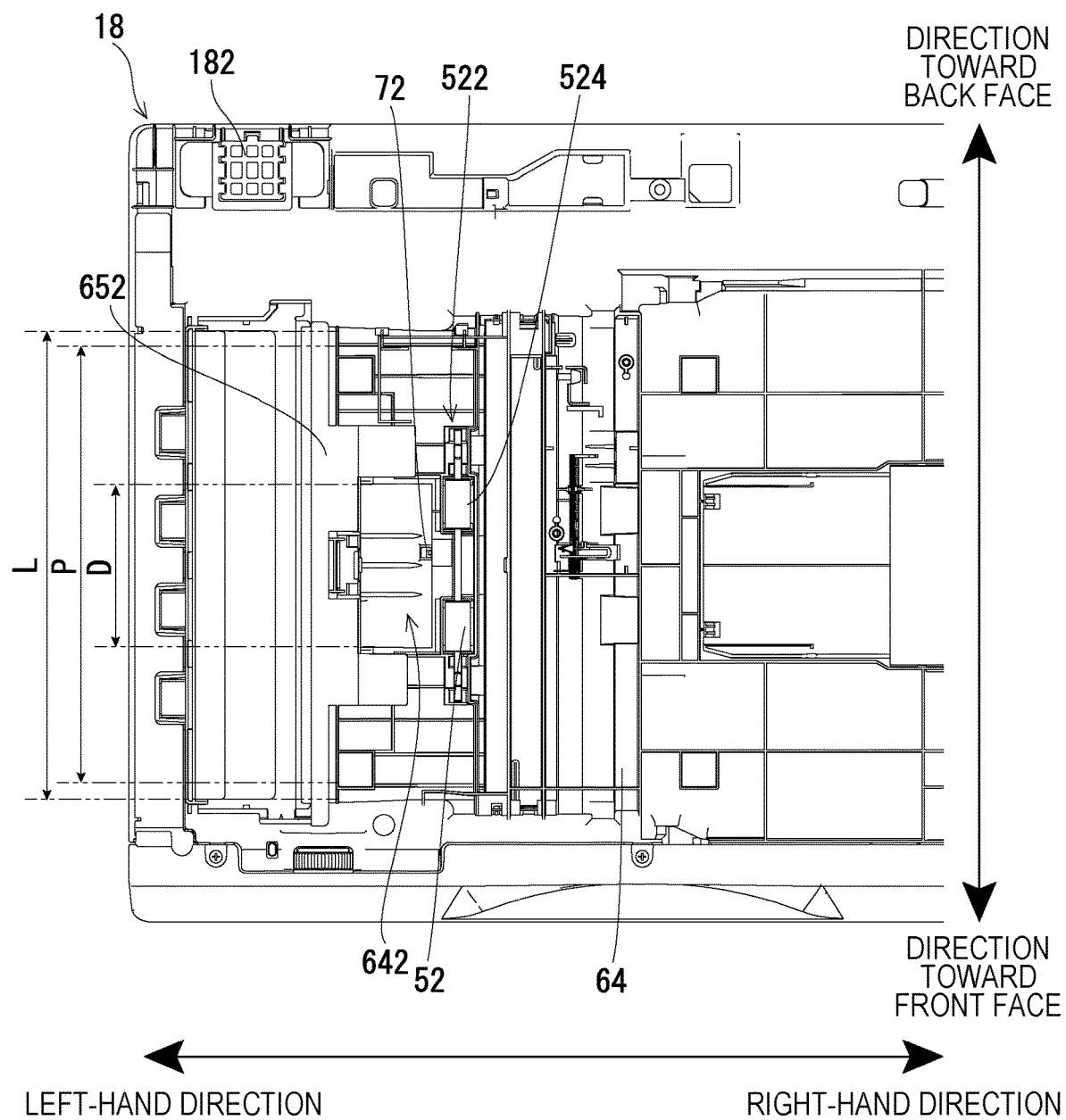
FIG. 11 illustrates an original-document-feeding apparatus according to a third embodiment viewed from below with a lid opened.
Figure 12:
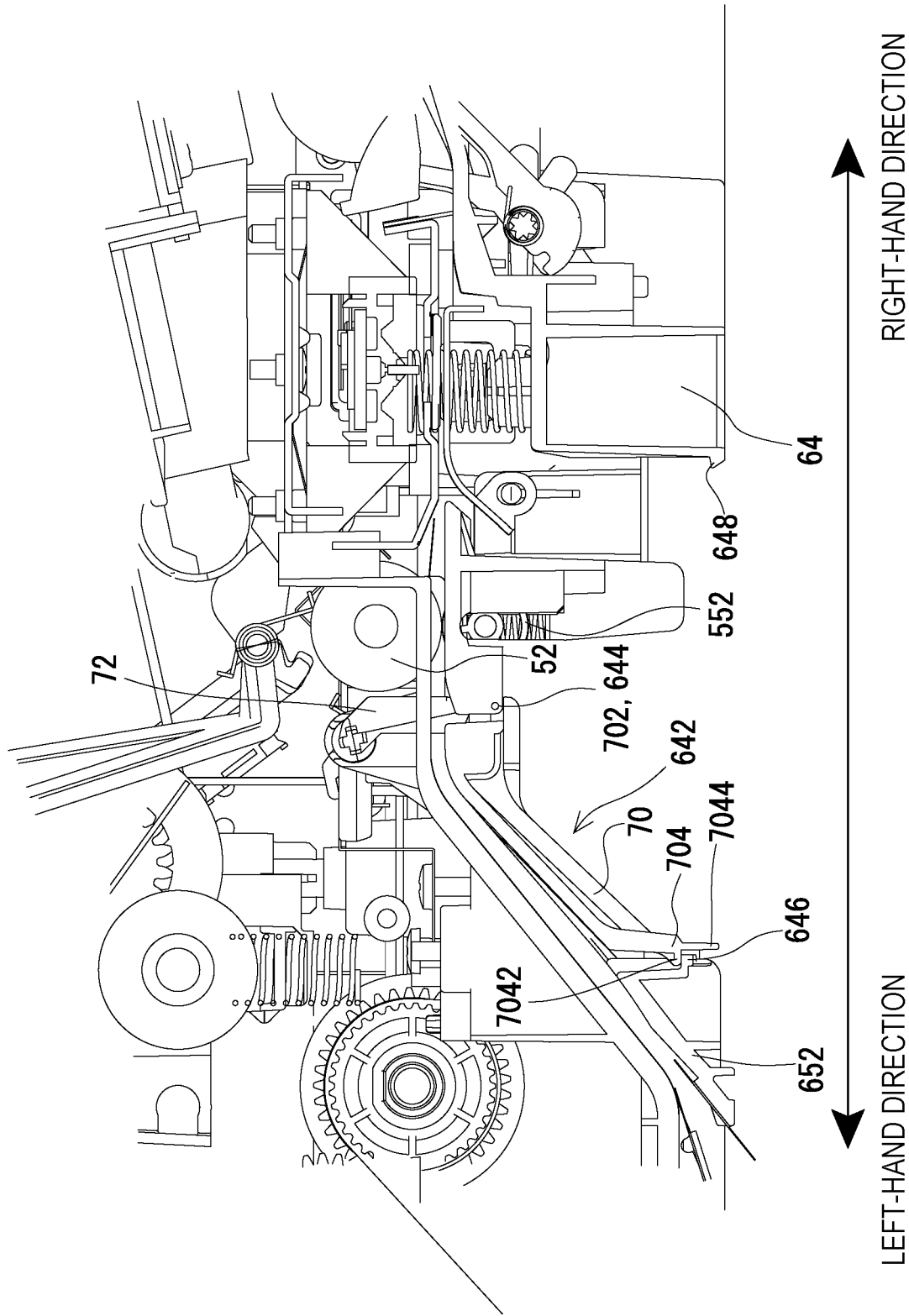
FIG. 12 schematically illustrates an enlarged sectional view of a part of an internal structure of the original-document-feeding apparatus according to the third embodiment.

FIG. 11 illustrates an original-document-feeding apparatus 22 according to the third embodiment viewed from below. FIG. 12 schematically illustrates an enlarged sectional view of a part of an internal structure of the original-document-feeding apparatus 22 according to the third embodiment.

As illustrated in FIG. 11 and FIG. 12, the third embodiment does not include the conveyance roller 50 according to the first embodiment that is disposed between the read position P1 and the conveyance roller 52. In addition, the third embodiment does not include the roller support 502 that supports the driven roller 504 of the conveyance roller 50 that is mounted on the second member 64.

According to the third embodiment, the opening 642 is located between the window frame 652 and the conveyance roller 52 in the original-document conveyance direction, and the window frame 652 is located upstream of the opening 642 of the second member 64. The window frame 652 located upstream of the opening 642 of the second member 64 has a certain length (for example, about 15 mm to about 25 mm) in the original-document conveyance direction.

According to the third embodiment, the mechanical strength or stiffness of the second member 64 that forms the second conveyance passage 34 can be endured, and a residual piece of paper or other substances on the second conveyance passage 34 can be readily removed as with the first embodiment.

Aspects described according to the third embodiment can be combined with those according to the second embodiment.

Although the present disclosure is described above with reference to the specific embodiments, the present disclosure is not limited to the above embodiments. The specific embodiments are described by way of example and can be appropriately modified in accordance with, for example, the specification of a product as necessary.

The present disclosure contains subject matter related to that disclosed in Japanese Priority Patent Application JP 2017-244596 filed in the Japan Patent Office on Dec. 21, 2017, the entire contents of which are hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. An original-document-feeding apparatus comprising:
    an original-document-loading tray;
    a first conveyance passage along which an original document is conveyed from the original-document-loading tray to an image reading position at which the original document is to be read;
    a second conveyance passage that is connected to the first conveyance passage and along which the original document is conveyed after the original document passes through the image reading position; and
    a conveyance-passage forming member that forms at least a lower surface of the second conveyance passage,
    wherein the conveyance-passage forming member has an opening, and
    wherein the conveyance-passage forming member includes a lid that opens and closes the opening.

2. The original-document-feeding apparatus according to claim 1, further comprising:
    a first conveyance roller that is disposed on the second conveyance passage and that conveys the original document,
    wherein the opening is located upstream of the first conveyance roller.

3. The original-document-feeding apparatus according to claim 2, further comprising:
    a second conveyance roller that is disposed on the second conveyance passage upstream of the first conveyance roller in a direction in which the original document is conveyed and that conveys the original document,
    wherein the opening is located downstream of the second conveyance roller.

4. The original-document-feeding apparatus according to claim 3,
    wherein the second conveyance roller is supported by a window frame upstream of the opening of the conveyance-passage forming member in the direction in which the original document is conveyed.

5. The original-document-feeding apparatus according to claim 1, further comprising:
    a lever that detects the original document that is conveyed along the second conveyance passage,
    wherein the lever is disposed within the opening.

6. The original-document-feeding apparatus according to claim 1,
    wherein the conveyance-passage forming member further includes a first holder that holds the lid with the lid closed.

7. The original-document-feeding apparatus according to claim 1,
    wherein the conveyance-passage forming member further includes a second holder that holds the lid with the lid opened.

8. The original-document-feeding apparatus according to claim 1,
    wherein the lid includes a guide rib that guides the original document that is conveyed along the second conveyance passage with the lid closed.

9. An image-reading apparatus comprising:
    the original-document-feeding apparatus according to claim 1; and
    an image-reading unit that reads the original document,
    wherein the image reading position is a position at which the image-reading unit reads the original document.

10. An image-forming apparatus comprising:
    the image-reading apparatus according to claim 9.

* * * * *